May 29, 1956     D. L. THOMPSON     2,747,321

FISH MOUTH SPREADER

Filed Jan. 26, 1953

Witness
Edward P. Seeley

Inventor
Donald L. Thompson
by Talbert, Dick & Adler
Attorneys

United States Patent Office 2,747,321
Patented May 29, 1956

2,747,321

FISH MOUTH SPREADER

Donald L. Thompson, Belmond, Iowa, assignor to Mar-Don Manufacturing Company, Belmond, Iowa Application January 26, 1953, Serial No. 333,214

3 Claims. (Cl. 43—53.5)

My invention relates to the art of fishing and specifically I have invented a means for spreading and holding open the mouth of a fish to facilitate removing a hook or lure from the mouth of the fish.

A fisherman who has the good fortune to fish for large game fish such as, muskellunge, has not solved all of his problems by merely hooking and landing such a fish. Once the fish is safely on the boat or on the bank it then becomes necessary to remove the hook or lure from the fish in order to use the hook again. Fish, such as, muskellunge, have sharp teeth and unless some means is provided for guaranteeing that the mouth of the fish remains open, the fisherman extracting a hook may well be bitten before he succeeds in extracting the lure or hook. It is possible to prop the mouth of the fish open by means of a stick or the like, but such means is not entirely satisfactory. In the first place such a prop can be inadvertently dislodged while struggling with the fish, and in the second place, a fish varies considerably in size. A prop that is small enough to go into the mouth of the smaller fish caught will not readily adapt itself to propping open the mouth of a large fish. If such crude means are used, therefore, it is usually necessary to have a variety of sizes. Furthermore, a stick used as a prop does not facilitate opening the mouth initially.

In view of the foregoing, therefore, it is the principal object of my invention to provide a fish mouth spreader that is safe to use.

It is a further object of my invention to provide a fish mouth spreader that aids in opening the closed mouth of a fish.

It is a further object of my invention to provide a fish mouth spreader that will operate successfully on a wide variety of sizes of fish.

It is a further object of my invention to provide a fish mouth spreader that is economical in construction, durable in use, and which requires no special skill or training to use.

These and other objects will be apparent to those skilled in the art.

My invention consists in the construction, arrangement and combination of the various parts of the device, whereby the objects contemplated are attained as hereinafter more fully set forth, and specifically pointed out in my claims, and illustrated in the accompanying drawings, in which:

Fig. 1 is a perspective view of my fish mouth spreader with the spreading jaws partially open, Fig. 2 is a side elevation view of my fish mouth spreader shown spreading the mouth of a toothed game fish, the latter being shown with broken lines. Broken lines are also used to illustrate the adjusted position of the spreader, and Fig. 3 is a plan view of my fish mouth spreader.

Referring to the drawings I have used the numeral 10 to designate one of the two identical elongated lever members which is provided at one end with the mouth engaging hook designated 12. At the opposite end of the lever generally designated 10, a handle portion 14 is formed and I have illustrated it as being made by simply twisting the flat stock which I have found very satisfactory for making the lever members and this twist is designated by the numeral 16. At a point intermediate of the handle and hook a bearing bar designated 18 is secured to the lever member and extends away from it in the opposite direction that the hook does. Thus while the hook extends away from one edge portion of the lever, the bearing bar extends away from the other edge portion of the lever and at a point intermediate of the length of the lever. At some point spaced from the bearing bar a means is provided in the lever for engaging the ratchet bar 20. I have illustrated a very satisfactory and extremely simple means in the slot 22 formed in the handle portion of the member. The bearing bar is pierced near its outer end and for a purpose that will become clear shortly. A second lever member identical to the first is provided and since it is identical its various parts are designated by the same numerals used on the first lever member suffixed with the small letter "a." For example, the member generally is designated 10a while the hook is 12a and the handle 14a.

These two lever members are disposed toward each other with their bearing bars overlapping so that the piercings in the bars align. Any suitable means is inserted through both bearings to pivotally secure the lever members together and I have illustrated a very satisfactory means as the rivet 24. The ratchet bar is provided with a notch at one end designated by the numeral 26. A plurality of ratchet teeth designated 28 are formed on the other end of the bar and extend for a substantial distance along its length. Between the ratchet teeth and the bar a means is provided for securing the resilient element such as the spring 30 to the ratchet bar. A very satisfactory means is shown in the form of a boss 32. Some means is also provided in the lever members for securing the other end of spring 30 and I have illustrated a simple means of doing this in the form of the hole 34a. A similar hole in the first mentioned lever arm is designated 34. The hole 34 serves no useful purpose in the device as shown assembled in the illustrations. The entire value in having this hole is to permit the use of the ratchet bar 20 in either the position shown or in an inverted position. In short, the handle members are exact duplicates of each other so that no variation in the units is necessary during manufacture. In short, one set of dies may be used to stamp out all of the lever members and any two lever members may be assembled into a complete spreader. The spring 30 serves a dual function, one of which, is to hold the notch 26 engaged with the lever member 10a. Once the ratchet bar is inserted into the slot 22a so that the notch 26 aligns with the edge of the slot, spring 30 urges it forward into contact with the slot end so that the notched end of the bar is prevented from moving further in either direction through the slot 22a. The other end of the bar is then inserted into the slot 22 and the spring also serves yieldingly to urge the bar toward the edge of slot 22 whereby the bar will slide over the edge of the handle whenever the edge of the slot aligns with the valleys between the teeth 28. Since the teeth are straight on their lower edges as shown in Fig. 1 and slanted on their top edges, obviously the bar 20 will offer no resistance to movement of the handles 14 and 14a toward each other. On the other hand, once the handle 14 has passed a tooth it will not of its own accord move back beyond the tooth unless the ratchet bar is released manually. To use my fish mouth spreader it is merely necessary to insert the mouth hook ends of the levers into the fish's mouth with the spreader in the position shown by the broken lines in Fig. 2. This is accomplished by releasing the ratchet bar 20 from the handle 14 and manually pushing the hook ends 12 and 12a toward each other. Once the device is in the mouth of the fish designated 36, the fisherman merely squeezes the handles 14 and 14a together which causes the mouth hook ends to force open the mouth of the fish while the ratchet bar 20 locks the spreader in the mouth propping position as shown by solid lines in Fig. 2. With the fish's mouth thus propped open the fisherman has no difficulty in removing his hook or lure without the slightest danger of being bitten by the fish.

Obviously I have invented a fish mouth spreader that accomplishes the purposes of my invention and which because its two major lever elements are of identical construction may be inexpensively and rapidly manufactured. Furthermore, if the fisherman should damage only one of the mouth spreader arms he may order a single lever arm which can be forwarded to him from the manufacturer without the necessity of inquiring as to which of the two arms was needed. This is also a valuable feature of my device.

Some changes may be made in the construction and arrangement of my fish mouth spreader without departing from the real spirit and purpose of my invention, and it is my intention to cover by my claims, any modified forms of structure or use of mechanical equivalents which may be reasonably included within their scope.

I claim:

1. In a fish mouth spreader, a pair of flat metal levers, two bearing ears each being secured to a different one of said pair of flat metal levers, means secured to each of said bearing ears pivotally securing them together; corresponding portions on the rear end portions of said levers being twisted to form rear handle portions; said handle portions each having a slot therein and to the rear of said bearing ears, a ratchet bar slidably engaged in slots in said lever handle portions; said ratchet bar having a notch near one end and ratchet teeth at the other end portion, and a spring secured to said ratchet bar and one of said bearing ears and yieldingly urging said ratchet bar toward the edges of said slots; said notch in said ratchet bar engaging the edge of one of said slots and said ratchet teeth selectively engaging the other of said slots; said ratchet teeth being straight on their under sides that face the top of the handle engaged by said notch and slanted on their other outer sides.

2. In a fish mouth spreader, a pair of flat metal levers, two bearing ears each being secured to a different one of said pair of flat metal levers, means secured to each of said bearing ears pivotally securing them together; corresponding portions on the rear end portions of said levers being twisted to form rear handle portions; said handle portions each having a slot therein and to the rear of said bearing ears, a ratchet bar slidably engaged in slots in said lever handle portions; said ratchet bar having a notch near one end and ratchet teeth at the other end portion, and a spring secured to said ratchet bar and one of said bearing ears and yieldingly urging said ratchet bar toward the edges of said slots; said notch in said ratchet bar engaging the edge of one of said slots and said ratchet teeth selectively engaging the other of said slots.

3. In a fish mouth spreader, a pair of flat metal levers, two bearing ears each being secured to a different one of said pair of flat metal levers, means secured to each of said bearing ears pivotally securing them together; corresponding portions on the rear end portions of said levers being twisted to form rear handle portions; said handle portions each having a slot therein and to the rear of said bearing ears, a ratchet bar slidably engaged in slots in said lever handle portions; said ratchet bar having a notch near one end and ratchet teeth at the other end portion, a spring secured to said ratchet bar and one of said bearing ears and yieldingly urging said ratchet bar toward the edges of said slots; said notch in said ratchet bar engaging the edge of one of said slots and said ratchet teeth selectively engaging the other of said slots, and a laterally and outwardly extending hook portion on the free outer and forward end of each of said metal levers.

References Cited in the file of this patent

UNITED STATES PATENTS

| | | |
|---|---|---|
| 974,500 | Leefson | Nov. 1, 1910 |
| 2,263,965 | Fiori | Nov. 25, 1941 |
| 2,595,989 | Smeltz | May 6, 1952 |